US006954902B2

(12) United States Patent
Noma et al.

(10) Patent No.: US 6,954,902 B2
(45) Date of Patent: Oct. 11, 2005

(54) INFORMATION SHARING PROCESSING METHOD, INFORMATION SHARING PROCESSING PROGRAM STORAGE MEDIUM, INFORMATION SHARING PROCESSING APPARATUS, AND INFORMATION SHARING PROCESSING SYSTEM

(75) Inventors: Tsunetake Noma, Tokyo (JP); Haruhiko Sakata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/539,511

(22) Filed: Mar. 30, 2000

(65) Prior Publication Data

US 2003/0179222 A1 Sep. 25, 2003

(30) Foreign Application Priority Data

Mar. 31, 1999 (JP) .......................................... P11-092867

(51) Int. Cl.[7] .............................................. G09G 5/00
(52) U.S. Cl. ...................................... 715/753; 715/758
(58) Field of Search ................................ 715/751, 753, 715/757, 758, 759; 345/751, 753, 759, 758, 768

(56) References Cited

U.S. PATENT DOCUMENTS

| | | | | |
|---|---|---|---|---|
| 5,793,365 A | * | 8/1998 | Tang et al. | ................... 715/758 |
| 5,805,163 A | * | 9/1998 | Bagnas | ........................ 345/768 |
| 5,880,731 A | * | 3/1999 | Liles et al. | ................... 345/473 |
| 5,999,191 A | * | 12/1999 | Frank et al. | ................. 345/634 |
| 6,047,288 A | * | 4/2000 | Kurosawa et al. | ............. 707/10 |
| 6,057,856 A | * | 5/2000 | Miyashita et al. | ........... 345/633 |
| 6,349,327 B1 | * | 2/2002 | Tang et al. | ................... 345/758 |
| 6,400,381 B1 | * | 6/2002 | Barrett et al. | ................ 345/745 |

* cited by examiner

Primary Examiner—Kristine Kincaid
Assistant Examiner—Thanh Vu
(74) Attorney, Agent, or Firm—Oblon, Spivak, McClelland, Maier & Neustadt, P.C.

(57) ABSTRACT

There is provided an information sharing processing method comprising the steps of a page display processing step for acquiring a file from a predetermined server on a network and displaying the file as a page, wherein the file is described in a predetermined page description language and includes a description of link information to another file on the network; a common-screen display processing step for displaying an icon representing a user at a position on a common screen shared with the user and displaying a message issued by the user making an access to the same page as the page displayed at the page display processing step, wherein information on the position and the message are specified by the user in shared data transmitted by the user by way of a shared server on the network; and a screen superposition processing step for superposing the common screen displayed at the common-screen display processing step on the page displayed at the page display processing step. Accordingly, it is possible to make an access to the web page with ease while participating a chat. In addition, any one of the users is capable of immediately knowing whether the other user is making an access to the same web page.

21 Claims, 17 Drawing Sheets

FIG. 3

```
<HTML>
<HEAD>
<TITLE> chat.com</TITLE>
<CHATSERVER URL = "cvtp://cv-server.chat.com/1.cvs" >
</HEAD>
<BODY>
ABCDEFGHIJKLMNOPQRSTUVWXYZ
</BODY>
</HTML>
```

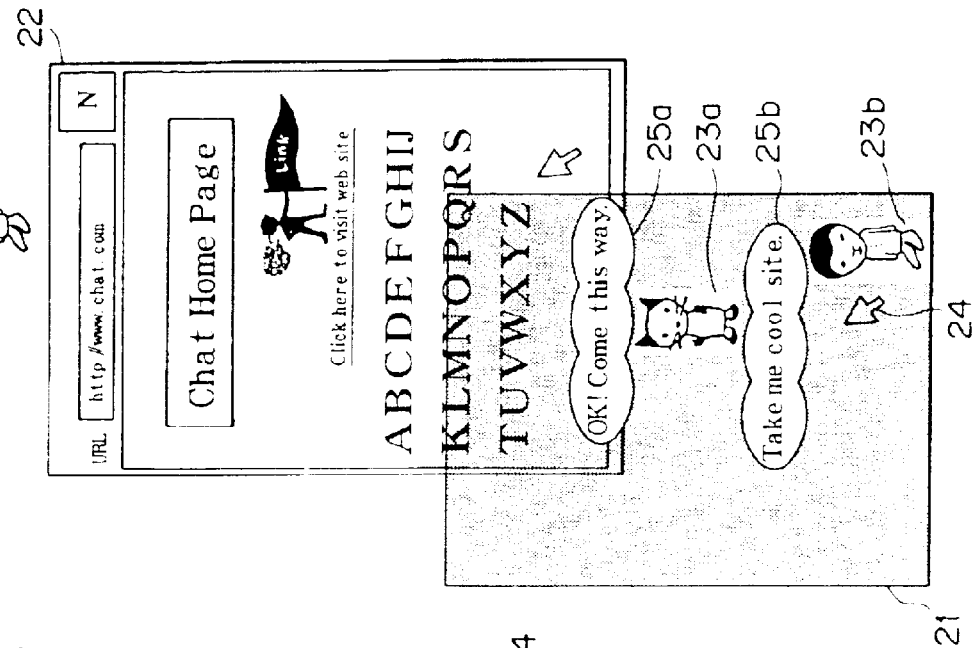
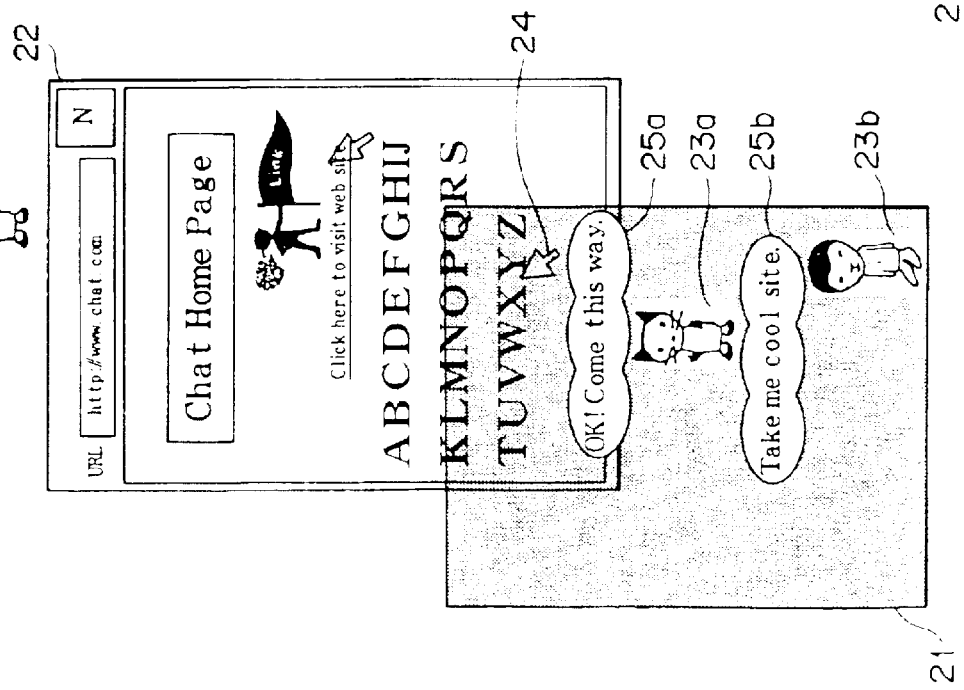

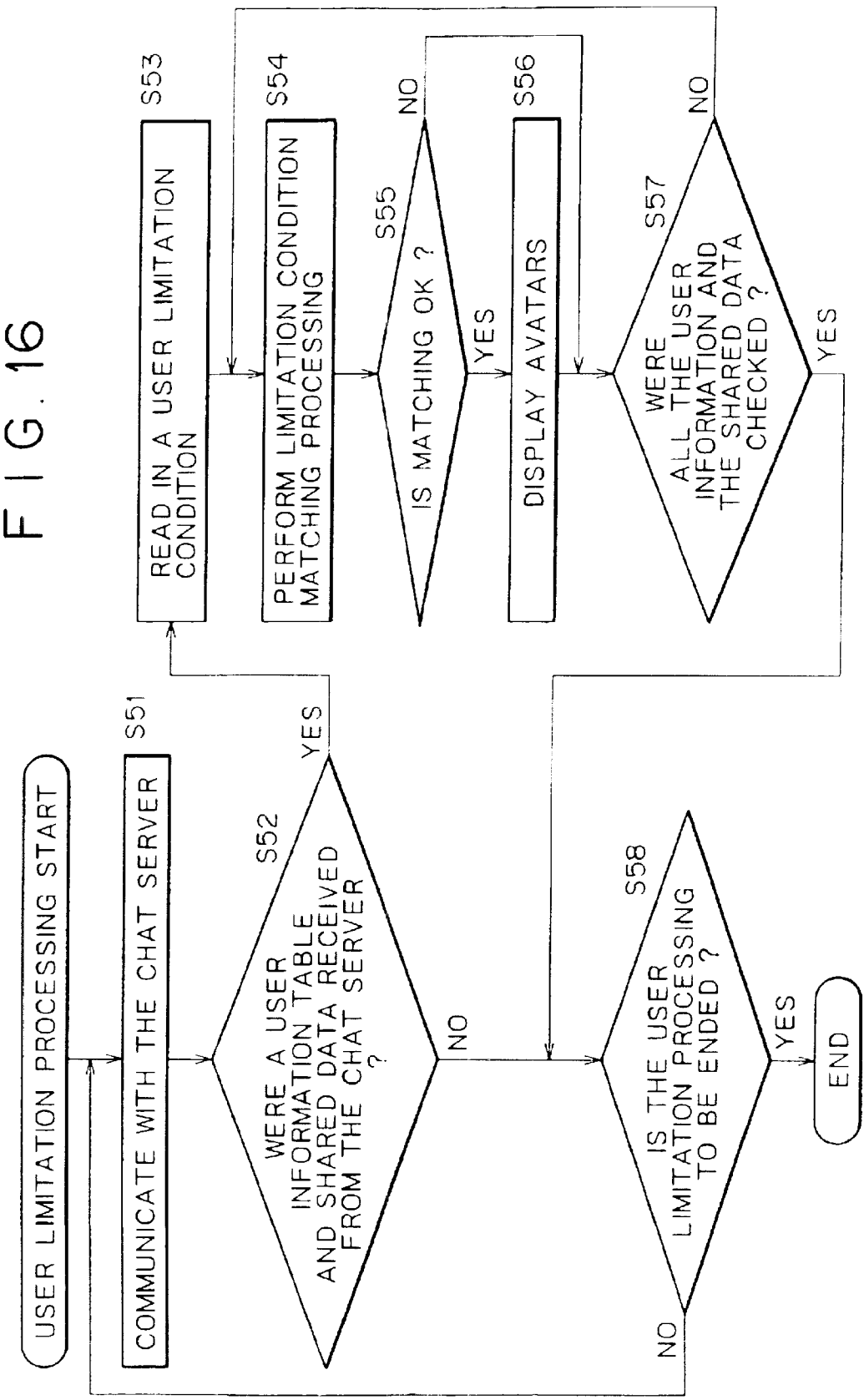

INFORMATION SHARING PROCESSING METHOD, INFORMATION SHARING PROCESSING PROGRAM STORAGE MEDIUM, INFORMATION SHARING PROCESSING APPARATUS, AND INFORMATION SHARING PROCESSING SYSTEM

BACKGROUND OF THE INVENTION

The present invention relates to an information sharing processing method, an information sharing processing program storage medium, an information sharing processing apparatus and an information sharing processing system which are used for carrying out interactive communications such as a chat system among the users through a network.

There has been widely used the so-called chat system allowing a plurality of users to communicate with each other by using personal computers connected to typically the Internet. With such a chat system, text data input by a personal computer is transmitted by the personal computer to other personal computers by way of a server to be displayed on the screen of the other personal computers.

In such a chat system, chat client software run on each personal computer of the user generally provides an input field used by the user for entering a text, a transmit button to be operated to make a request for a transmission of the text and a chat history field for showing lists of received and transmitted texts along with nick names of each user in a chronological order with the lapse of time.

The user enters the own statement to the input field as a text and then clicks the transmit button. By doing so, the user's statement is listed in the chat history field and then transmitted to other users through the network. When the statement is received by any user serving as a destination of the transmission, the user's statement is displayed in the chat history field in the personal computer of the destination user. On the other hand, the statement received from another user is displayed in the chat history field as a text in the personal computer of the user serving as a recipient of the statement.

A visual chat system is a chat system wherein an avatar representing a user participating in chats is displayed in a 2-dimensional or 3-dimensional virtual space displayed on the screen of a personal computer. An avatar of a user is expressed by an icon representing the user. On the other hand, a text chat system is a chat system wherein only nicknames of participants and texts each representing the statement voiced by a user are displayed.

By the way, in order to browse a web page stored in a WWW (World Wide Web) server and used for exhibiting information such as a text and a picture, a WWW browser is used. In a WWW server, a variety of HTML (Hyper Text Markup Language) files each composing data of a web page are stored. For each HTML file, a URL (Uniform Resource Locator) is described for uniquely identifying the HTML file among other HTML files on the Internet. A URL assigned to a desired HTML file is specified by the user by using a WWW browser to acquire the HTML file from a WWW server on the Internet in accordance with an HTTP (Hyper Text Transfer Protocol). In this way, a web page can be browsed by the user as visible information.

In order to browse web pages while having chats as described above, the chat client software for implementing the chat systems and the WWW browser for browsing the web pages are activated separately and used alternately.

By the way, when a plurality of users make an attempt to induce a partner to go into the same web page while exchanging opinions through chat systems as described above, the URL assigned to the desired web page is transmitted to the partner as text information during a chat. On the personal computer used by the partner receiving the URL information, the URL must be entered and supplied to the WWW browser, causing an ongoing chat to be interrupted. As a result, there is raised a problem of inability to continue the natural tempo chat on the topical web page.

In addition, it is impossible to immediately know whether another user is browsing the same web page or has surfed up to another web page.

SUMMARY OF THE INVENTION

It is thus an object of the present invention addressing the problems described above to provide a chat system which allows the users to make an access to the same web page with ease while having a chat and allows a user to immediately know whether another user is making an access to the same web page or not.

An information sharing processing method according to claim 1 is characterized in that the method comprises the steps of: a page display processing step for acquiring a file from a server on a network and displaying the file as a page, wherein the file is described in a predetermined page description language and includes a description of a link to another file on the network; a common-screen display processing step for displaying an icon representing a user at a position on a common screen shared with the user and displaying a message issued by the user making an access to the same page as the page displayed at the page display processing step, in which information on the is specified by the user in shared data transmitted by the user by way of a shared server on the network; and a screen superposition processing step for superposing the common screen displayed at the common-screen display processing step on the page displayed at the page display processing step.

A medium for storing an information sharing processing program is characterized in that the program comprises: a page display processing step for acquiring a file from a server on a network and displaying the file as a page, wherein the file is described in a predetermined page description language and includes a description of link information to another file on the network; a common-screen display processing step for displaying an icon representing a user at a position on a common screen shared with the user and displaying a message issued by the user making an access to the same page as the page displayed at the page display processing step, in which information on the position is specified by the user in shared data transmitted by the user by way of a shared server on the network; and a screen superposition processing step for superposing the common screen displayed at the common-screen display processing step on the page displayed at the page display processing step.

An information sharing processing apparatus is characterized in that the apparatus comprises: page display processing means for acquiring a file from a server on a network and displaying the file as a page, wherein the file is described in a predetermined page description language and includes a description of link information to another file on the network; common-screen display processing means for displaying an icon representing a user at a position on a common screen shared with the user and displaying a message issued by the user making an access to the same page as the page displayed by the page display processing means, in which information on the position is specified by the user in shared data transmitted by the user by way of a shared server on the network; and screen superposition processing means for superposing the common screen displayed by the common-screen display processing means on the page displayed by the page display processing means.

An information sharing processing system is characterized in that the system comprises: a server for providing a file which is described in a predetermined page description language and includes a description of link information to any other desired file on a network; a shared server for exchanging shared data with users on the network through the network, wherein the shared data comprises information on a position on a common screen to be shared with the users, types of icons each representing one of the users and messages each issued by one of the users; page display processing means for acquiring a file from the server and displaying the file as a page; common-screen display processing means for displaying the icons representing the users at positions on the common screen shared with the users and displaying the messages issued by the users each making an access to the same page as the page displayed by the page display processing means, in which information on the positions is specified by the user in the shared data transmitted by the users by way of the shared server; and screen superposition processing means for superposing the common screen displayed by the common-screen display processing means on the page displayed by the page display processing means.

In the information sharing processing method, the medium for storing an information sharing processing program, the information sharing processing apparatus and the information sharing processing system according to the present invention, a file is acquired from a server on a network and displayed as a page, wherein the file is described in a predetermined page description language and includes a description of link information to another file on the network; an icon representing a user and a message issued by the user are displayed at a position on a common screen shared by the users making an access to the same page on display, in which information on the position and the message are specified by the user in shared data transmitted by the user by way of a shared server on the network; and the common screen is displayed by superposition on the displayed page.

BRIEF DESCRIPTION OF THE DRAWINGS

FIG. 3 is a diagram showing typical source code of an HTML file including a tag for connecting the client computer to a chat server of the server;

FIGS. 6A and 6B are explanatory diagrams showing screens displayed by the client computer and the client computer;

FIG. 16 shows a flowchart processing carried out by the client computer to limit chat partners.

DETAILED DESCRIPTION OF THE PREFERRED EMBODIMENTS

Figure 1:
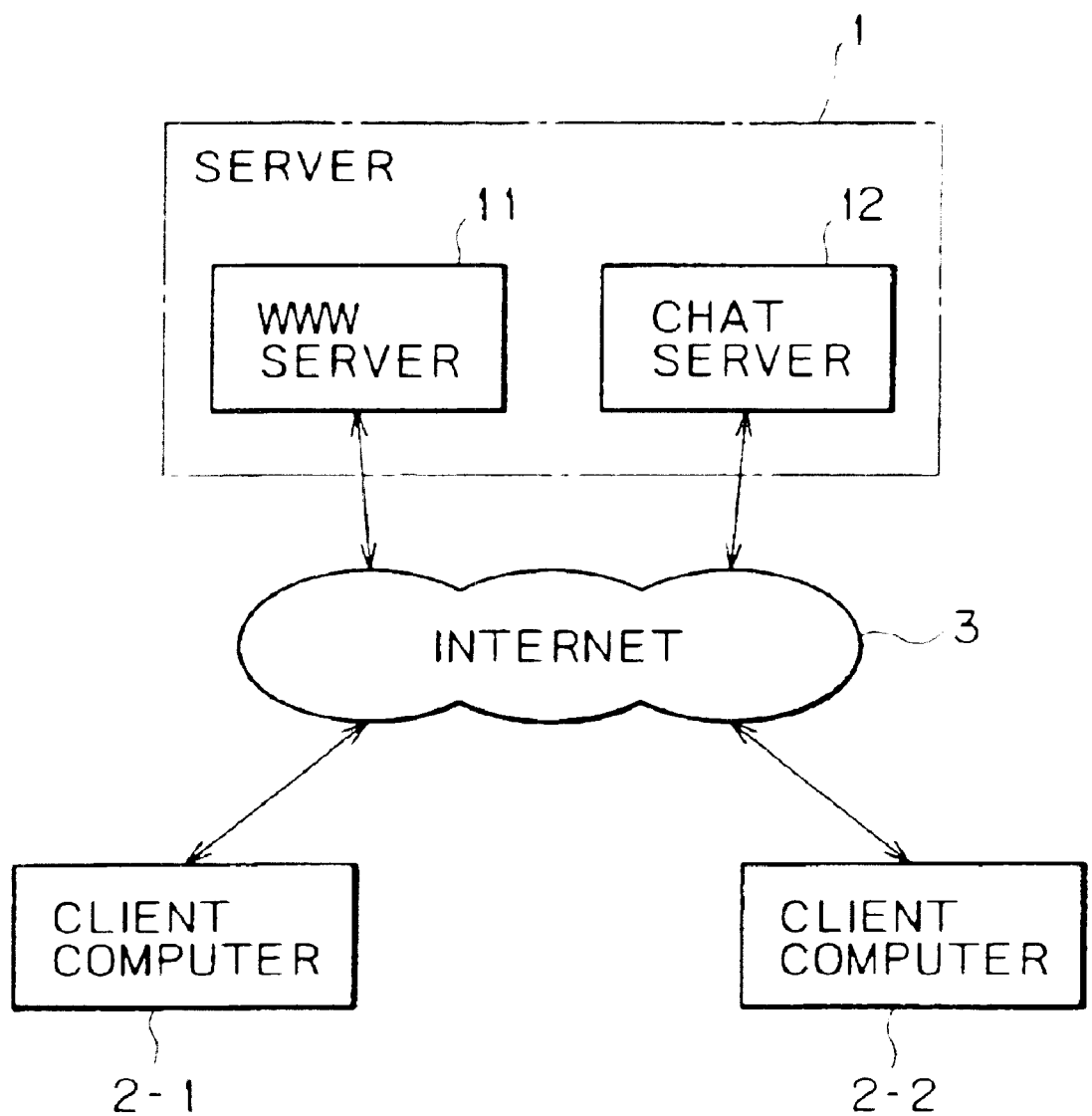
FIG. 1 is a diagram showing the configuration of an embodiment implementing a 2-dimensional visual chat system provided by the present invention.

FIG. 1 is a diagram showing the configuration of an embodiment implementing a visual chat system provided by the present invention. A client computer 2-1 and a client computer 2-2 are each a personal computer on the client side. The client computer 2-1 and the client computer 2-2 are connected to a WWW server 11 and a chat server 12 by the Internet 3.

The WWW server 11 and the chat server 12 can also be implemented by an HTTPd (Hyper Text Transfer Protocol daemon) server program and a chat shared server program which run on a physically single server 1. As an alternative, the functions of the WWW server 11 and the chat server 12 can also be implemented by an HTTPd server program and a chat shared server program which run separately on the WWW server 11 and the chat server 12 respectively.

The client computer 2-1 or 2-2 requests the WWW server 11 to transmit a desired HTML file in accordance with the HTTP (Hyper Text Transfer Protocol). In response to such a request, the WWW server 11 transmits the desired HTML file requested by the client computer 2-1 or 2-2 to the requesting client computer by executing the function of the HTTPd program.

In the following description, the client computer 2-1 and the client computer 2-2 are referred to simply as a client computer 2, a generic name given to them, when there is no need to distinguish one client computer from the other.

In an HTML file transmitted to the client computer 2, a description of the URL of the chat server 12 to which the client computer 2 is to be connected is included. The client computer 2 is then connected to the chat computer 12 at the URL of the chat server 12 which is described in the HTML file.

Figure 2:
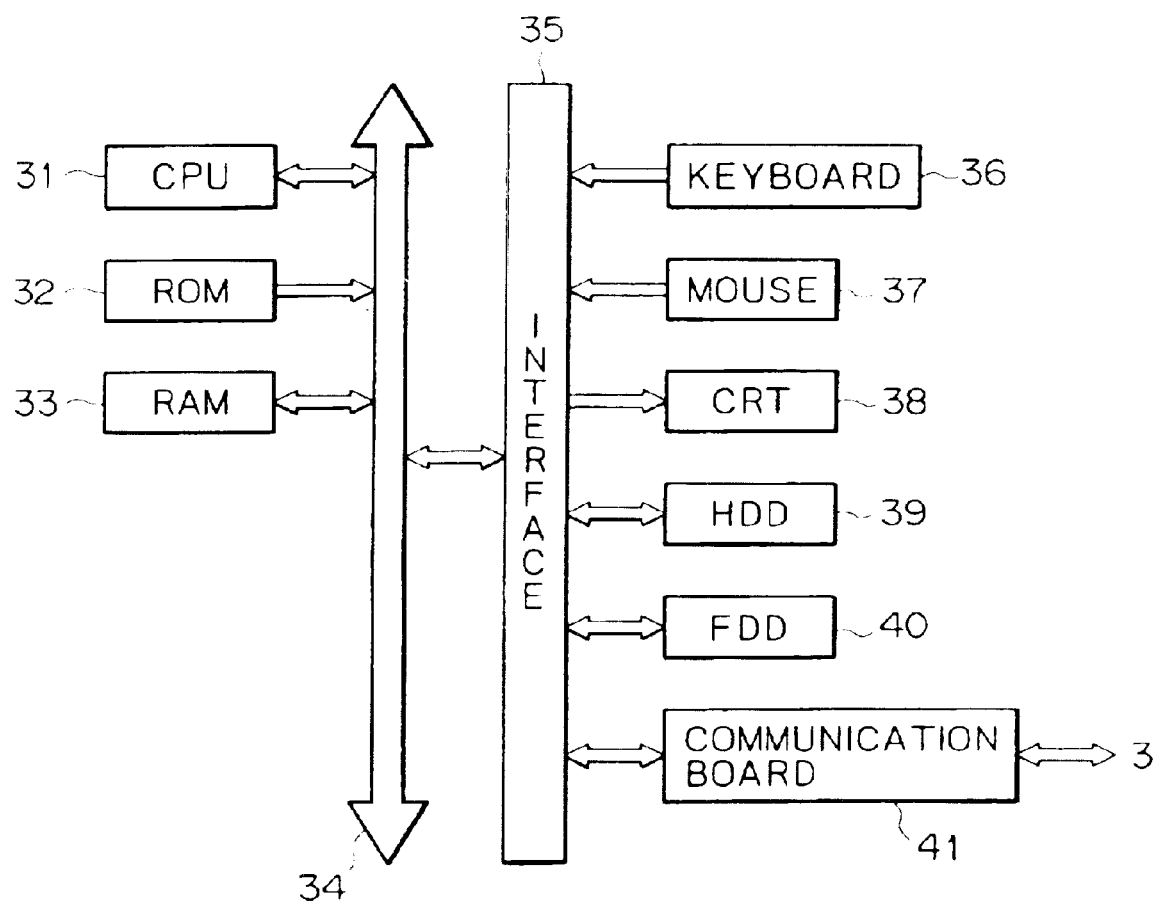
FIG. 2 is a diagram showing a typical hardware configuration of a client computer employed in the 2-dimensional visual chat system shown in FIG. 1.

FIG. 2 is a diagram showing a typical hardware configuration of the client computer 2 employed in the visual chat system shown in FIG. 1. It should be noted that, since the hardware configuration of the server 1 is the same as that of the client computer 2 shown in FIG. 2, the description of the former is omitted.

In the client computer 2, a CPU (central processing unit) 31 executes a basic program called an OS (operating system) and executes a variety of application programs under the OS in order to carry out various kinds of processing to be described later. In general, a ROM (read-only memory) 32 is used for storing the programs executed by the CPU 31 and data which is basically fixed and used as parameters in the processing. A RAM (random-access memory) 33 is used for storing a program being executed by the CPU 31 and information such as data required in the processing. These components of the client computer 2 are connected to each other by a bus 34.

A keyboard 36 is operated by the user for entering a variety of commands to the CPU 31. A mouse 37 is operated by the user for pointing to or selecting a position on the screen of a CRT (cathode ray tube) 38 which is used for displaying various kinds of information such as a text and/or an image. An HDD (hard disk drive) 39 and an FDD (floppy disk drive) 40 drive a hard disk and a floppy disk respectively in operations to record or play back information and load a program to be executed by the CPU 31. It should be noted that the hard disc and the floppy disc themselves are not shown in the figure. A communication board 41 is a unit for connecting the client computer 2 to the Internet 3. To put it concretely, the communication board 41 is implemented by components such as an Ethernet board, a modem and a terminal adapter.

These components, from the keyboard 36 to the communication board 41, are connected to an interface 35 which is connected to the CPU 31 by the bus 34.

FIG. 3 is a diagram showing typical source data recorded in an HTML file including a tag <CHATSERVER> specifying a URL for connecting the client computer 2 to the chat server 12. "cvtp" shown in the typical source of an HTML file shown in FIG. 3 specifies a protocol to be adopted for chats. In the example shown in FIG. 3, the domain name of the chat server is "cv-server.chat.com". "1.cvs" following the domain name of the chat server 12 specifies a file for recording information required in chats to be described later. The file is stored in the chat server 12. Thus, "1.cvs" is the name of the file.

The chat server 12 of the server 1 operates by implementing the following function through execution of a predetermined chat shared program.

Figure 13:
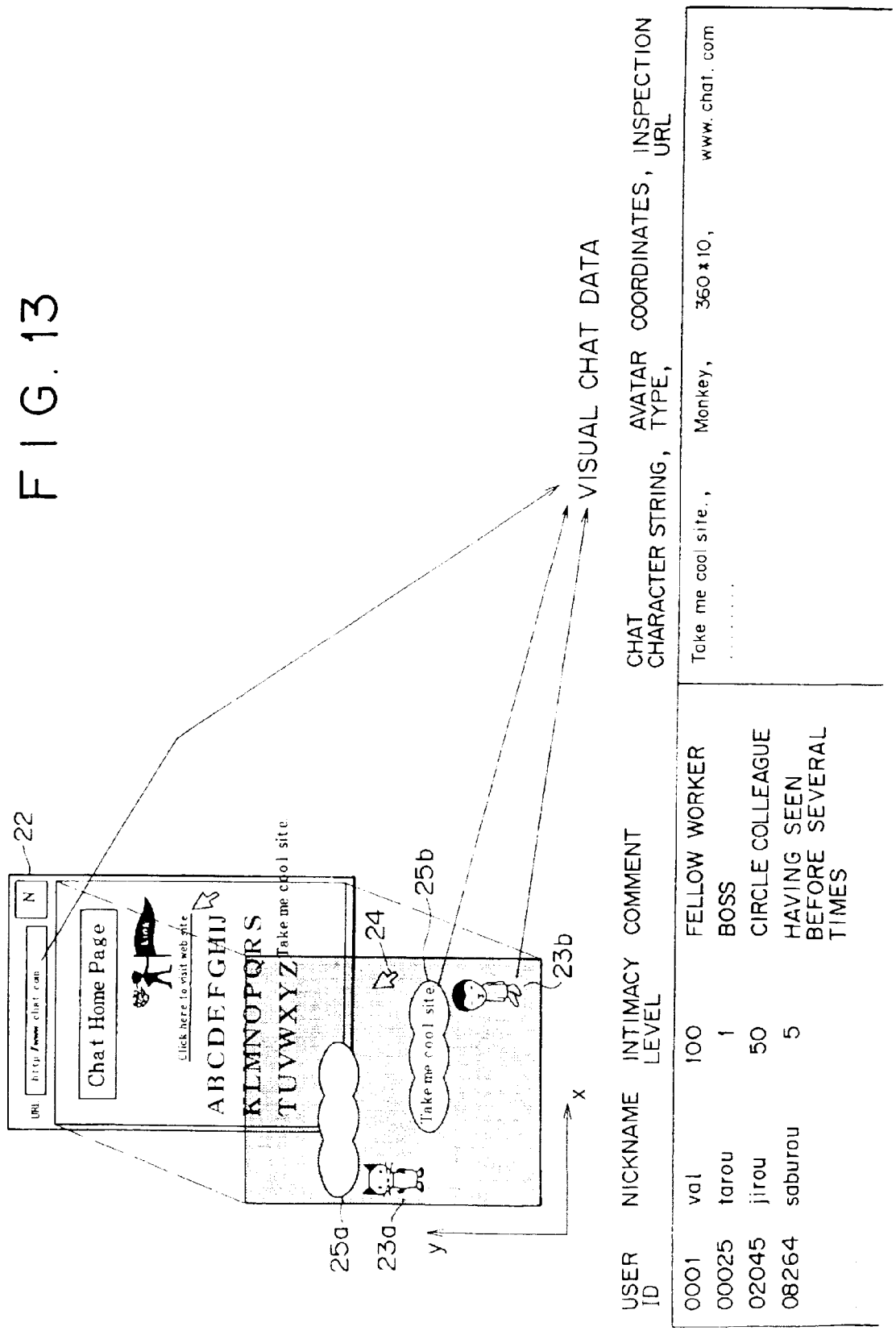
FIG. 13 is a diagram showing a relation between a user information table and shared data supplied by the chat server.

The chat server 12 receives shared data including a text of an utterance of the user and information on a behavior of an avatar for the user from the client computer 2, and transmits this shared data to the other client computer 2 by way of the Internet 3. The shared data is pieces of information each comprising a URL of a web page being browsed, XY coordinates of the avatar, the type of the avatar, a chat character string, a nickname and a user ID as shown in FIG. 13 to be described later. For example, the chat server 12 receives shared data showing a text of a chat and a behavior of an avatar or the like from the client computer 2-1, and transmits a text of a chat and this shared data showing behaviors of avatars and the like to the client computers 2-1 and 2-2.

The client computer 2 displays a web page based on an HTML file received from the WWW server 11. At the same time, the client computer 2 also displays a 2-dimensional virtual space based on shared data showing behaviors of avatars or the like and a text of an utterance of the user received from the chat server 12, superposing the 2-dimensional virtual space on the web page. Icons serving as the avatars representing the users and balloons each showing a text of an utterance of the user are displayed on the 2-dimensional virtual space.

The client computer 2 transmits shared data showing a behavior of the avatar and a text of a chat, which correspond to operations carried out by the user, to the chat server 12. The client computer 2 also requests the WWW server 11 to transmit an HTML file.

FIGS. 4 to 11 are explanatory diagrams each showing a transition of screens displayed by the client computer 2. In each of these figures, a diagram A on the right-hand side shows a screen displayed by the client computer 2-1 wherein a cat icon is set in advance as an avatar representing the user of the client computer 2-1. On the other hand, a diagram B on the left-hand side shows a screen displayed by the client computer 2-2 wherein a monkey icon is set in advance as an avatar representing the user of the client computer 2-2.

A web page supplied by the WWW server 11 as an HTML file is displayed on the screen of the client computer 2 as an HTML display layer 22 by an HTML rendering function of the web browser. In the example shown in FIGS. 4A and 4B, a home page with a URL of http://www.chat.com is displayed respectively.

On the other hand, pictures in the 2-dimensional virtual space comprising avatar icons 23a and 23b and balloons 25a and 25b showing texts of utterances of the users are displayed on the screen of the client computer 2 as a chat layer 21. The 2-dimensional virtual space is based on shared data received from the chat server 12. The shared data is pieces of information each comprising a URL of a web page being browsed, XY coordinates of the avatar, the type of the avatar, a chat character string, a nickname and a user ID as shown in FIG. 13 to be described later.

Figure 4A:
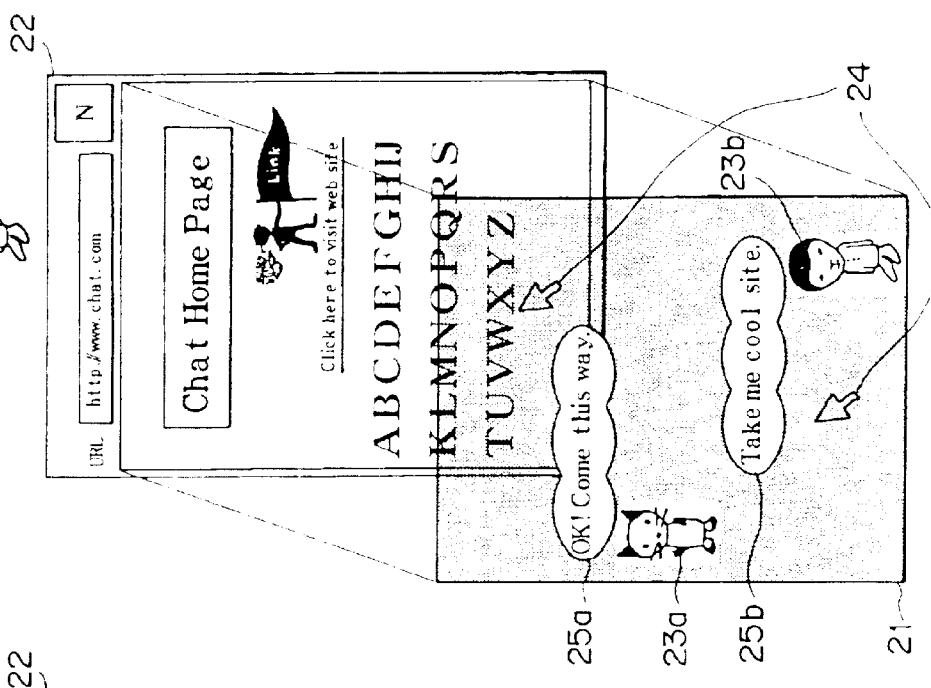
FIGS. 4A and 4B are explanatory diagrams showing screens displayed by the client computer and the client computer.
Figure 4B:
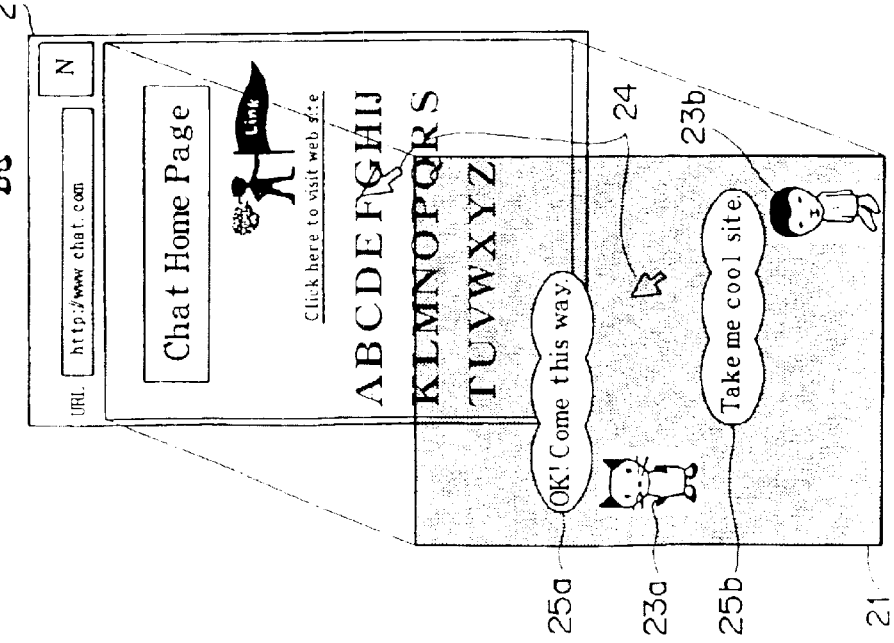

On the display screen of the client computer 2, the chat layer 21 is displayed, being superposed on the HTML display layer 22. A mouse pointer 24 which moves in accordance with an operation carried out on the mouse 37 of the client computer 2 is also displayed on the screen. For the sake of convenience, separate mouse pointers 24 are displayed on the chat layers 21 and the HTML display layers 22 as shown in FIGS. 4A and 4B. In actuality, however, the separate mouse pointers 24 are the same thing.

The display of the avatar icons 23a and 23b, the balloons 25a and 25b showing texts of utterances of the users and the mouse pointer 24 on the chat layer 21 takes precedence of the display of the web page on the HTML display layer 22. That is to say, the avatar icons 23a and 23b, the balloons 25a and 25b showing texts of utterances of the users and the mouse pointer 24 are displayed over pictures of the web page appearing on the display screen of the client computer 2.

In other words, the chat layer 21 is positioned in front of the HTML display layer 22.

Thus, in the screen of the client computer 2 being watched by the user, pictures of the web page including link information to another page, the avatar icons 23a and 23b, the balloons 25a and 25b showing texts of utterances of the users and the mouse pointer 24 are diplayed.

It should be noted that a text of an utterance of the user may also be displayed on another window appearing on another displayed screen of the client computer 2.

Figure 5A:
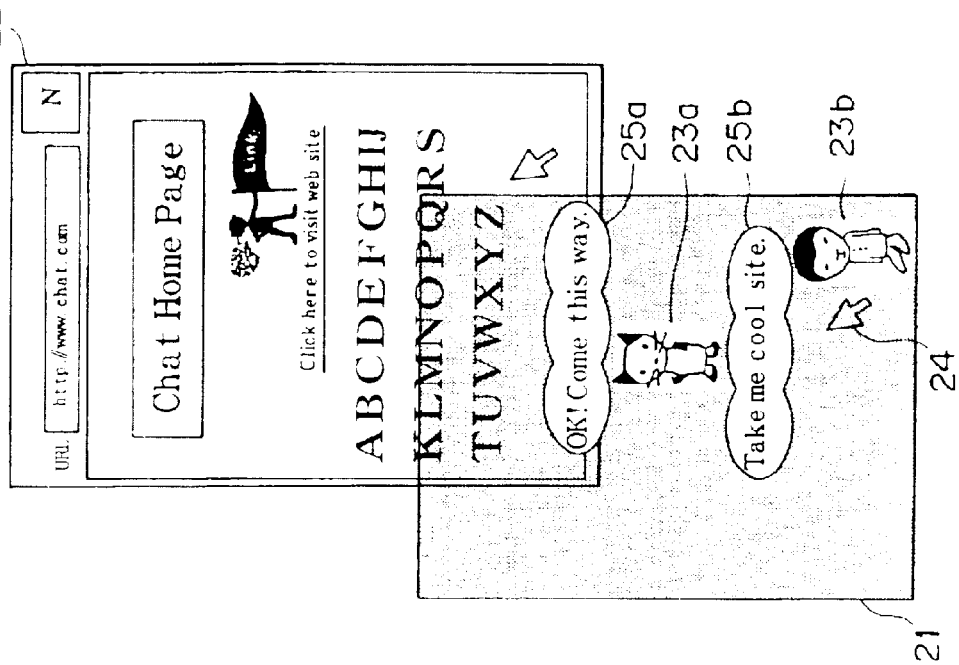
FIGS. 5A and 5B are explanatory diagrams showing screens displayed by the client computer and the client computer.
Figure 5B:
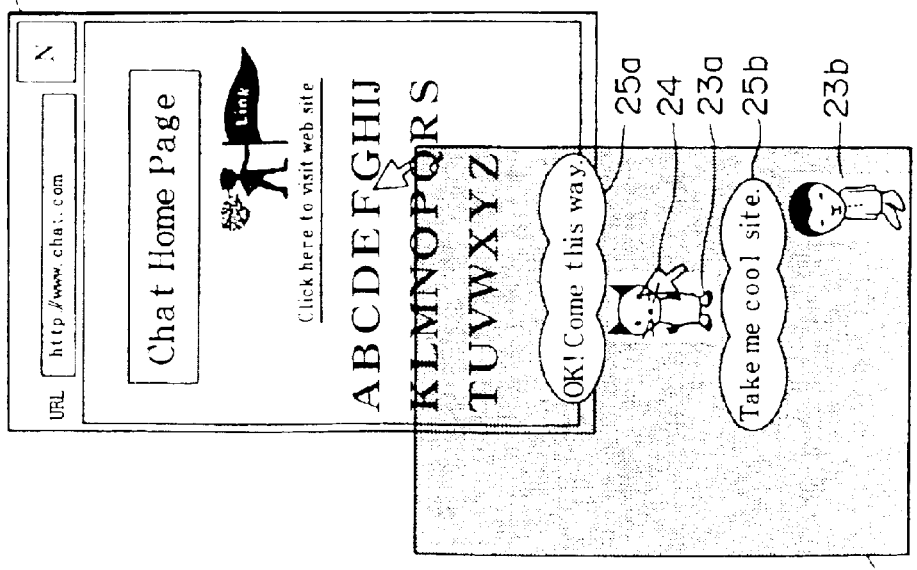

If the mouse pointer 24 is moved by the user of the client computer 2-1 to a position on the display screen and the mouse 37 is clicked, the avatar icon 23a moves to the clicked position pointed to by the mouse pointer 24 as shown in FIG. 5A. The avatar icon 23a representing the user also moves accordingly over the display screen of the other client computer 2-2 as shown in FIG. 5B.

Figure 7A:
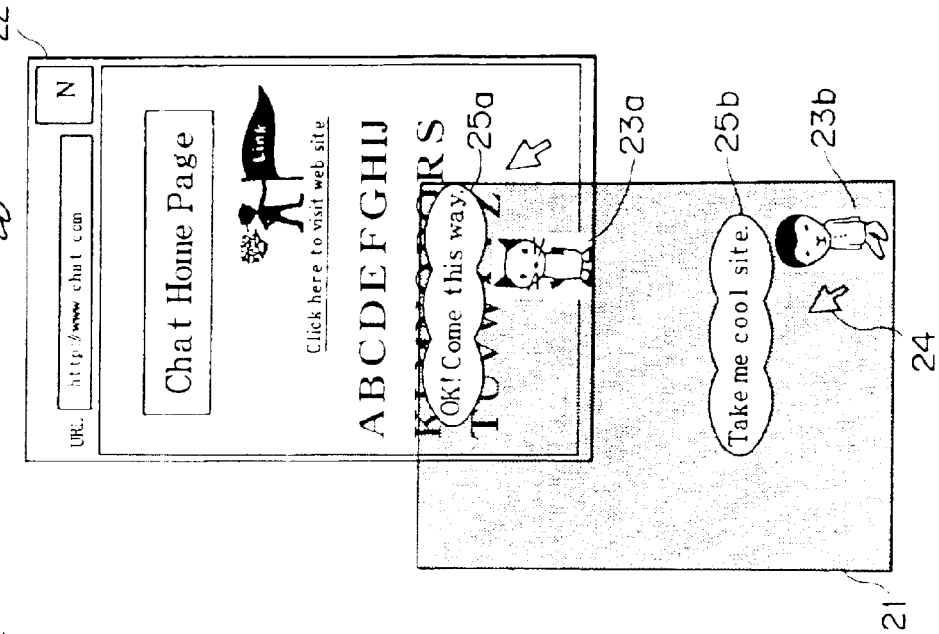
FIGS. 7A and 7B are explanatory diagrams showing screens displayed by the client computer and the client computer.
Figure 7B:
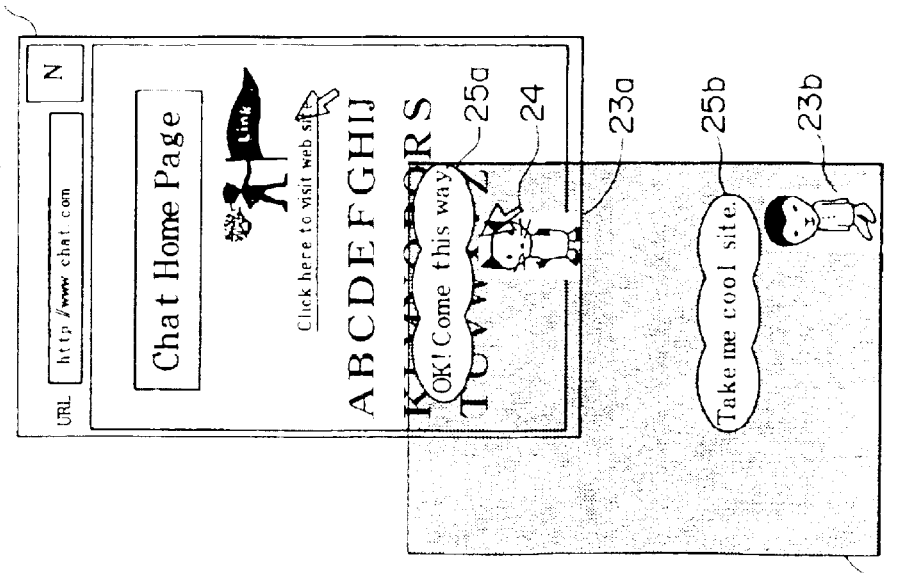

If the mouse pointer 24 is moved by the user of the client computer 2-1 to a position of the description of link information to another web page on the display screen and the mouse 37 is clicked as shown in FIG. 6A, the avatar icon 23a moves to the position of the description of link information to another web page on the display screen in a preparation to change the display screen to the other web page as shown in FIG. 7A.

Figure 8A:
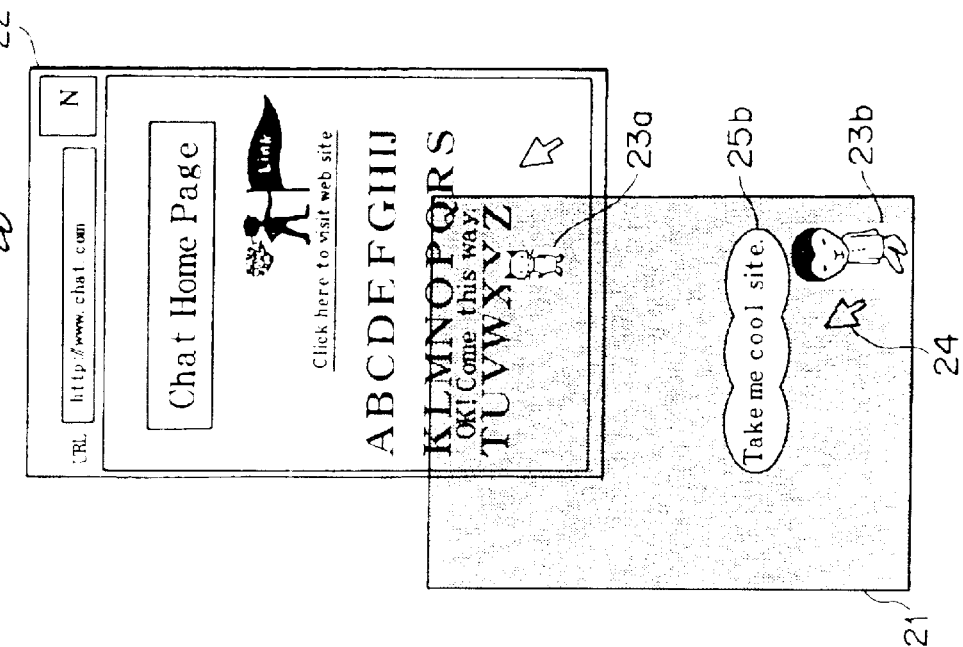
FIGS. 8A and 8B are explanatory diagrams showing screens displayed by the client computer and the client computer.
Figure 9A:
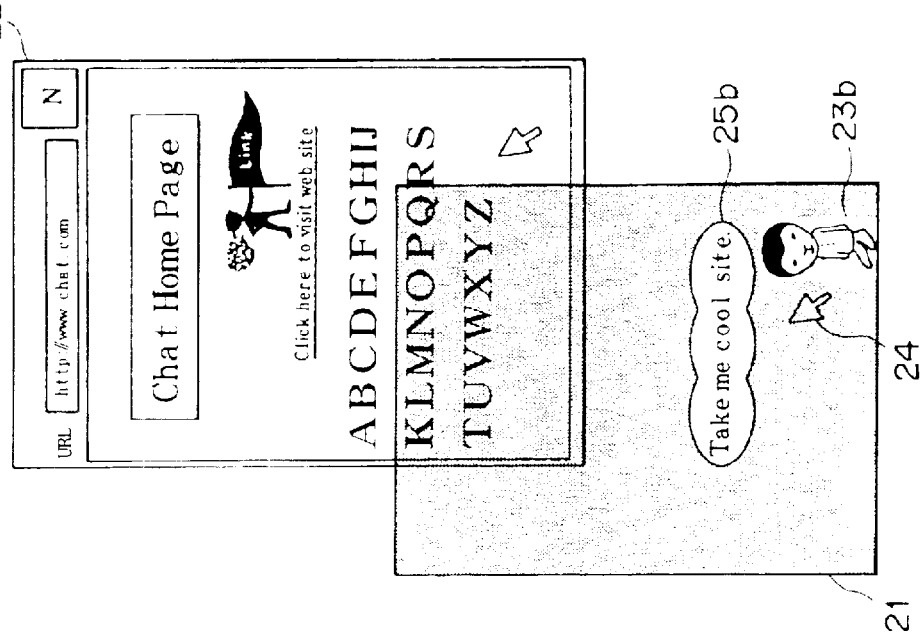
FIGS. 9A and 9B are explanatory diagrams showing screens displayed by the client computer and the client computer.

Then, the display of the avatar icon 23a shrinks gradually to indicate the transition to the other web page as shown in FIG. 8A. Eventually, the avatar icon 23a vanishes as shown in FIG. 9A.

The effect of the avatar icon 23a to indicate a transition to the other web page can also be expressed by, for example, a blinking display of the avatar icon 23a with a gradually shortened blinking interval leading to disappearance as an alternative to the shrinking display described above. As another alternative, the effect can also be expressed by gradual vanishing of the avatar icon 23a starting with the lowest part of the icon 23a.

Figure 10A:
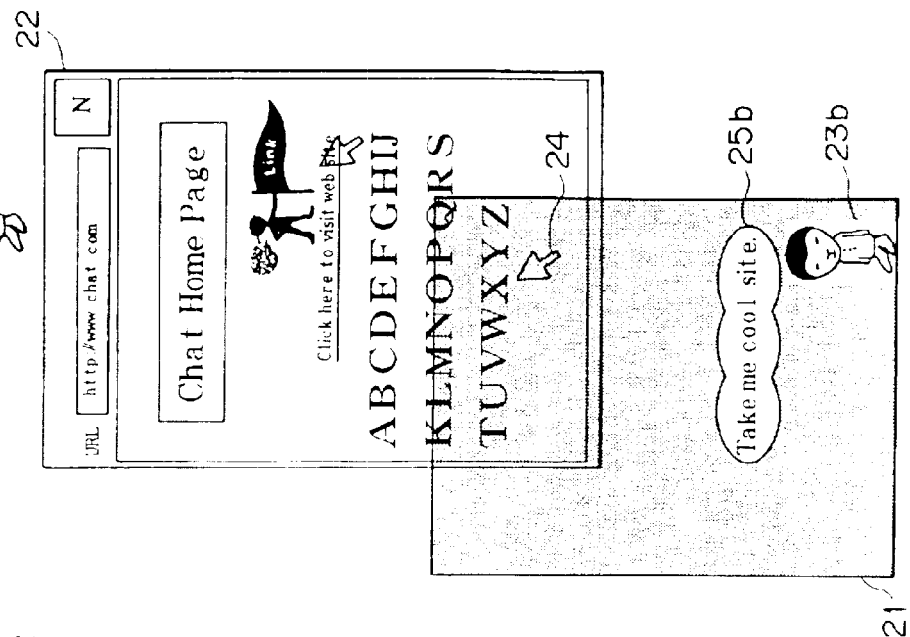
FIGS. 10A and 10B are explanatory diagrams showing screens displayed by the client computer and the client computer.

Thereafter, the HTML display layer 22 of the client computer 2-1 is switched to the other web page, as shown in FIG. 10A. In the case of the example shown in that figure, the URL of the other web page is http://www.cool.com.

Figure 8B:
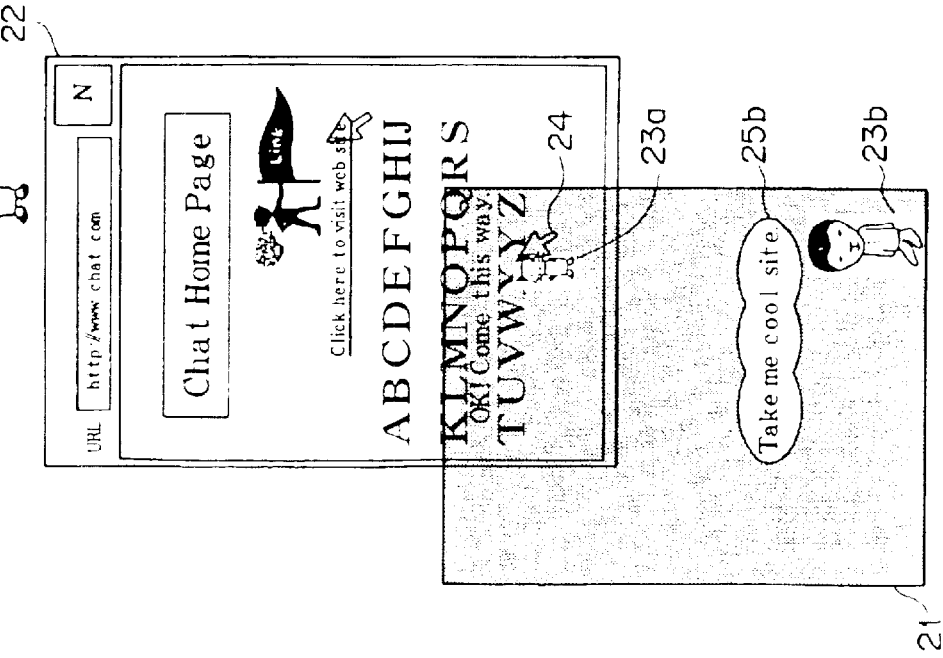
Figure 9B:
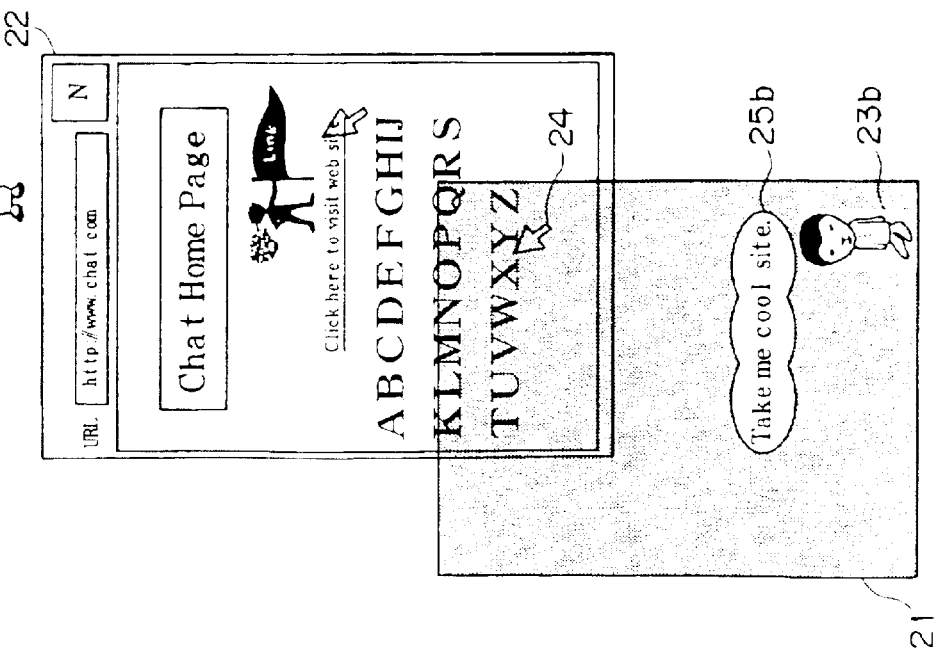
Figure 10B:
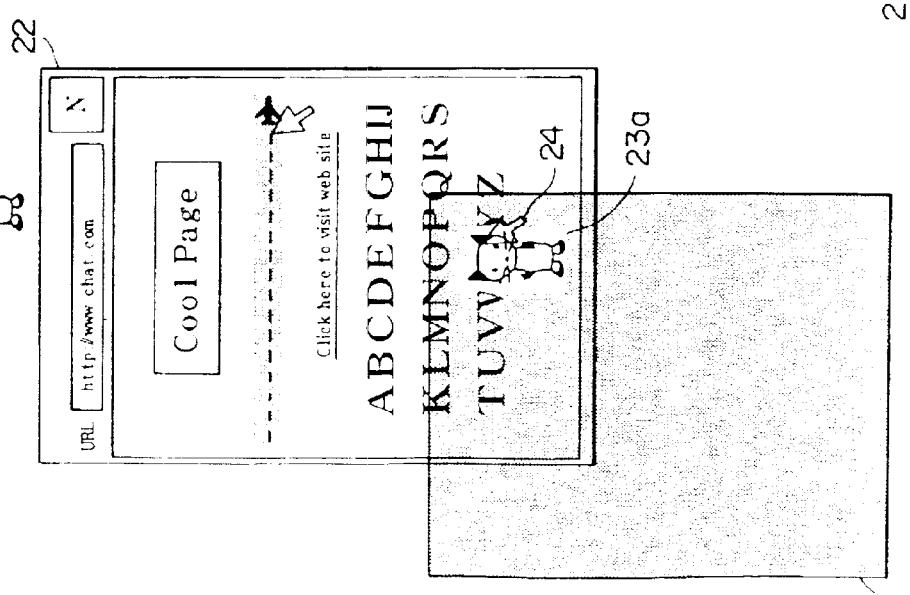

At that time, on the web page appearing on the display screen of the client computer 2-2 as an HTML display layer 22 similarly to the client computer 2-1, the display of the avatar 23a representing the user of the client computer 2-1 is also shrinking before vanishing to indicate that the display is being switched to another web page as shown in FIGS. 8B, 9B and 10B.

In this way, the user of the client computer 2-2 is informed that the avatar 23a representing the user of the client computer 2-1 has migrated to another web page and further informed of a link used in the migration to the other web page.

Figure 11A:
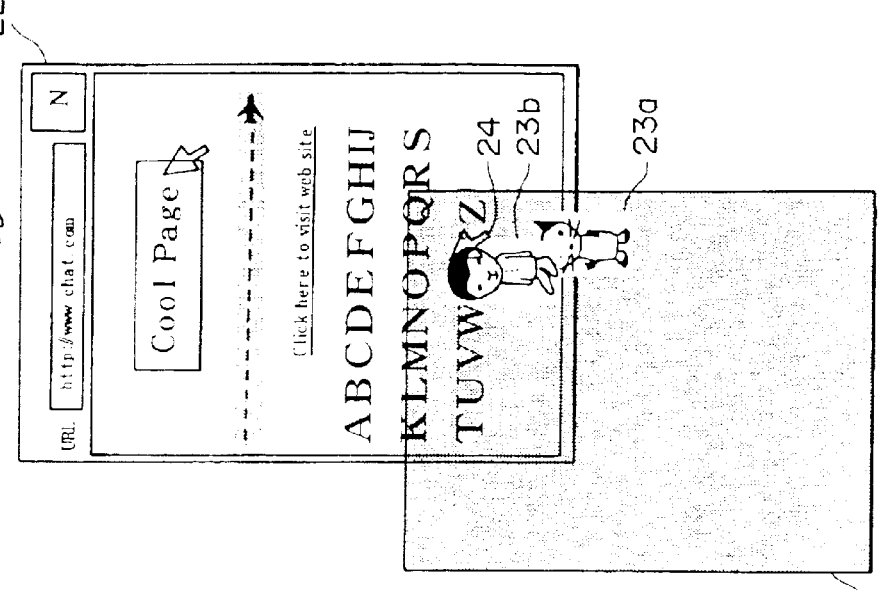
FIGS. 11A and 11B are explanatory diagrams showing screens displayed by the client computer and the client computer.
Figure 11B:
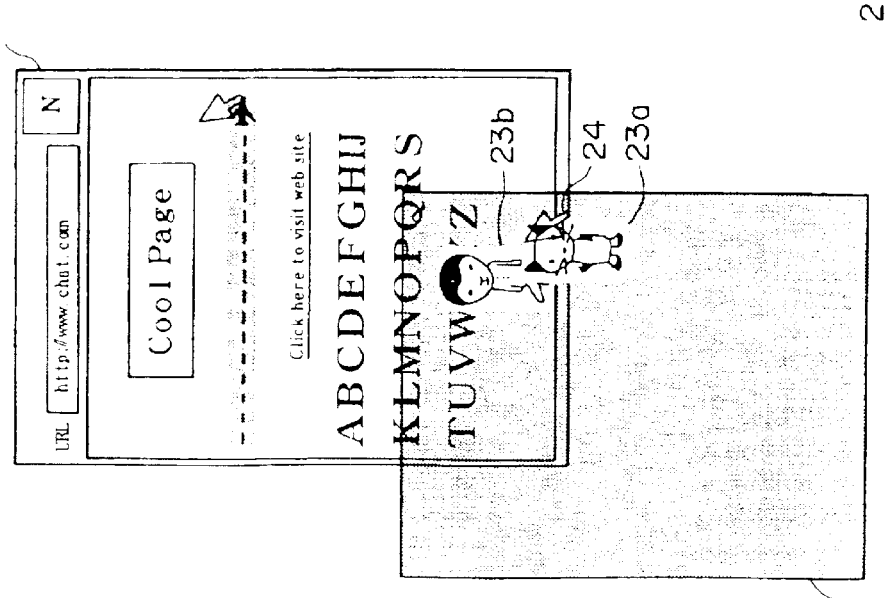

Thus, the user of the client computer 2-2 is allowed to move the avatar icon 23b from the present position on the display screen to a position of a description of the link to the other web being accessed by the user of the client computer 2-1 in order to migrate from the present web page shown in FIG. 10B to the other web page shown in FIG. 11B by moving the mouse pointer 24 to the position of the same link destination used by the user of the client computer 2-1 and then clicking the mouse 37. In the case of the example shown in FIG. 11B, the URL of the other web page is http://www.cool.com.

As a result, the avatar icons 23a and 23b both appear on the same web page as shown in FIGS. 11A and 11B.

The HTML file indicated as a destination of the link can also be supplied by a WWW server other than the WWW server 11 of the server 1. It should be noted, however, that the other WWW server is shown in none of the figures.

Figure 12:
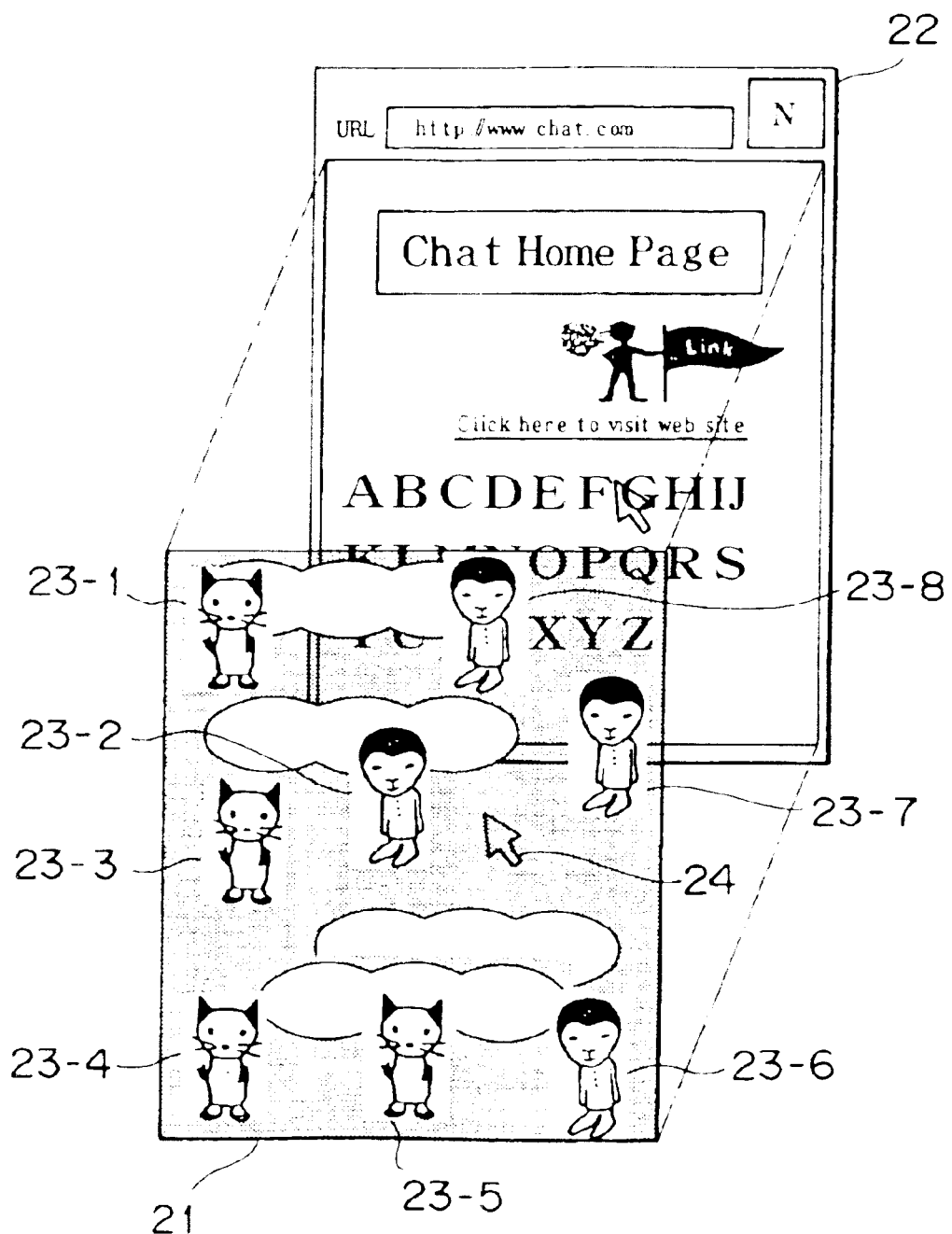
FIG. 12 is an explanatory diagram showing a typical screen displayed by the client computer.

FIG. 12 is a diagram showing a typical screen of the client computer 2 for a case in which a number of users participate in a chat through the same page. As shown in the figure, the display screen of the client computer 2 shows icons 23-1 to 23-8 of avatars representing the users participating in the chat through the same page. When a number of users participate in a chat through the same page, loads borne by the chat server 12 of the server 1 and the client computers 2 increase in magnitude. Thus, it takes a longer time to update the display on the client computer 2. As a result, the conversation among the users becomes confusing.

In order to solve the problem described above, the user is allowed to limit the number of other users serving as chat partners. FIG. 13 is a diagram showing a relation between a user information table and shared data (or visual chat data) exchanged with chat partners. Used in setting a limitation on chat partners, the user information table is provided for each user and stored in the chat server 12. ID (Identification Data) stored in the user information table is unique data assigned to other users participating in chats. A nickname is used in chats in place of the real name of another user participating in the chats.

An intimacy level is a value set for each other user to indicate an intimacy between the user and the other user. The value is in the range 0 to 100. The greater the value, the greater the intimacy between the user and the other user. A comment is set by the user for another user to indicate a characteristic or a type of the other user. A comment is described by a text.

Data stored in the user information table can be edited by the user of the client computer 2 by operating the client computer 2.

In the typical user information table shown in FIG. 13, another user identified by an ID of "0001" has a user name of "val", an intimacy level of "100" and a comment of "Fellow worker". Another user identified by an ID of "00025" has a user name of "tarou", an intimacy level of "1" and a comment of "Boss". A further user identified by an ID of "02045" has a user name of "jirou", an intimacy level of "50" and a comment of "Circle colleague". A still further user identified by an ID of "08264" has a user name of "saburou", an intimacy level of "5" and a comment of "Having seen before several times".

As described above, a user information table is set by the user itself. The user information table is provided for each user participating in chats through the chat server 12 and stored in the chat server 12.

The client computer 2 is provided with information stored in a user information table set for a chat partner described above and shared data (or visual chat data) also shown in FIG. 13 through the chat server 12. The shared data is pieces of information each comprising a chat character string, the type of the avatar, XY coordinates of the position of the avatar and an inspection URL for each user ID. A chat character string is a text entered by the chat partner. An example of the chat string character is "Take me cool site." which is displayed as a balloon 25b. The type of the avatar is data specifying the avatar icon 23b. In the example shown in FIG. 13, the type of the avatar is "Monkey" which specifies a monkey icon representing the avatar. The XY coordinates of the position of the avatar are XY coordinate values expressed in terms of units determined in advance to indicate a display position of the avatar icon 23b on the chat layer 21. In the example shown in FIG. 13, the XY coordinates are "360*10". The inspection URL is a URL of a web page currently being inspected at the HTML file display layer 22. In the example shown in FIG. 13, the inspection URL is "www.chat.com."

By using the user information table, the user is allowed to impose limitation on other users each serving as a chat partner as will be described below.

Figure 14:
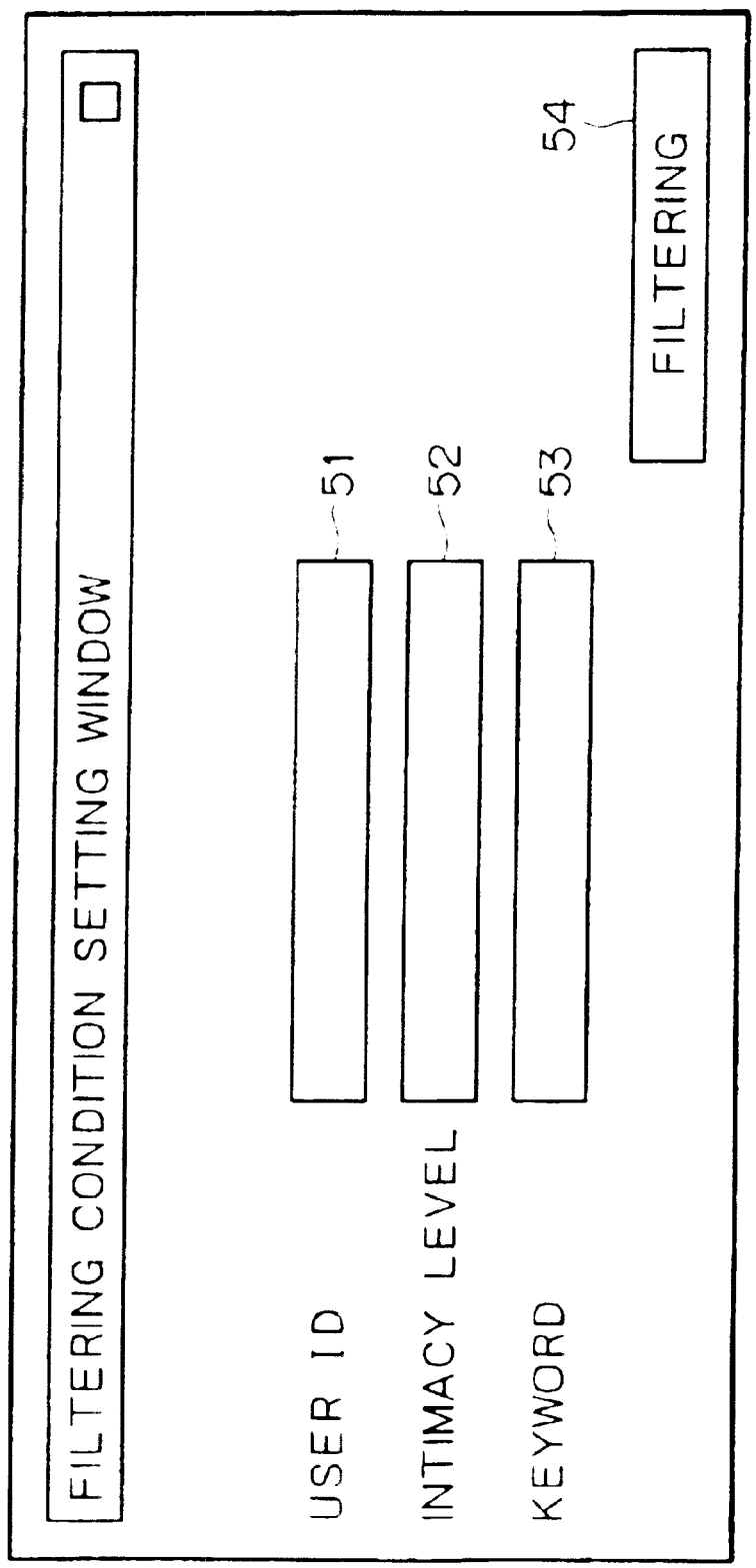
FIG. 14 is a diagram showing a typical filtering condition setting window.

FIG. 14 is a diagram showing a typical filtering condition setting window for setting limitations on chat partners based on data stored in a user information table. When it is desired to have a chat only with another user with a predetermined ID, the user sets the predetermined ID of the other user in a user ID setting field 51 on the filtering condition setting window and then clicks a button 54 named filtering. Assuming that the user information table shown in FIG. 13 is used, "0001" is entered to the user ID setting field 51 and the filtering button 54 is clicked. In this case, only an icon of an avatar representing the user itself and an icon of an avatar representing the other user with a nickname of "val" are thereafter displayed on the screen of the client computer 2. With such a limitation, the user is capable of having chats only with another user identified by a nickname of "val" and a user ID of "0001".

When it is desired to have a chat only with other users each having an intimacy level set at a predetermined value or greater, the user enters the predetermined value to an intimacy level setting field 52 and clicks the filtering button 54. Assuming again that the user information table shown in FIG. 13 is used, "50" is entered to the intimacy level setting field 52 and the filtering button 54 is clicked. In this case, only an icon of an avatar representing the user itself, an icon of an avatar representing the other user with a nickname of "val" and an icon of an avatar representing the other user with a nickname of "jirou" are thereafter displayed on the screen of the client computer 2. With such a limitation, the user is capable of having chats only with the other users identified by a nickname of "val" and a nickname of "jirou" and intimacy levels greater than "50".

A predetermined keyword for another user to serve as a chat partner is entered to a keyword setting field 53 on the filtering condition setting window and the filtering button 54 is clicked when it is desired to have a chat only with the other user identified by the keyword. The keyword can be the user name or a phrase included in a comment for the other user. Assuming again that the user information table shown in FIG. 13 is used, the words "Fellow worker/Boss" are entered to the keyword setting field 53 and the filtering button 54 is clicked. In this case, the user is capable of having chats only with other users identified by a nickname of "val" and a nickname of "tarou" and associated with comments including the word "Fellow worker" and/or "Boss".

As another example of the limitation by using a keyword, assuming that a string of characters "rou" is entered to the keyword setting field 53 and the filtering button 54 is clicked, the user is capable of having chats only with other users identified by a nickname including the string of characters "rou" or associated with a comment including the string of characters "rou". In the case of the user information table shown in FIG. 13, the other users which will serve as chat partners are users having nicknames of "tarou", "jirou" and "saburou".

By selecting only chat partners satisfying a predetermined condition as described above, chats will not become confusing even if the number of other users participating in chats using the same page increases. With a limited number of chat participants, an input text can be displayed on the screen of the client computer 2 in a short period of time during a chat.

Figure 15:
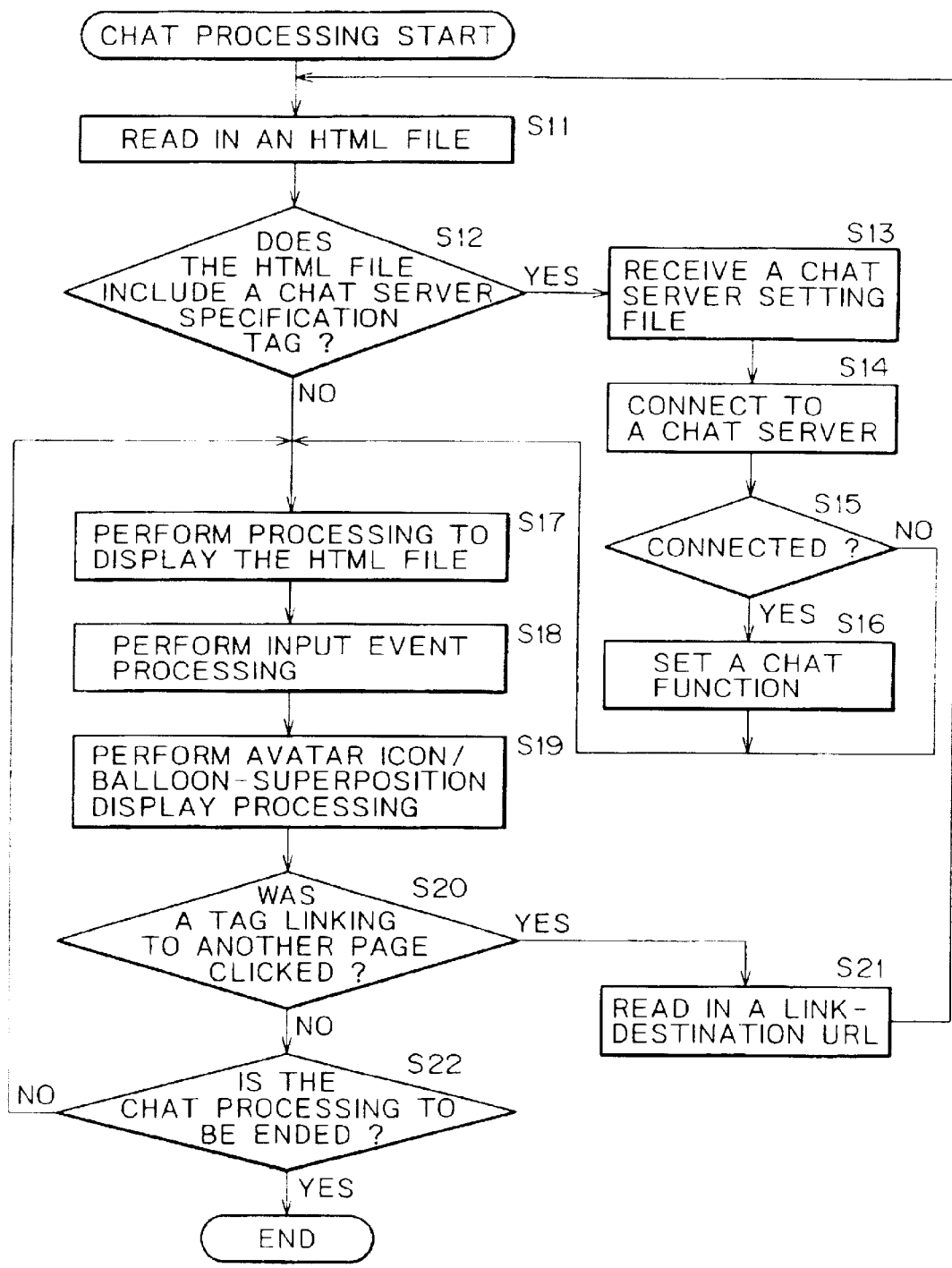
FIG. 15 shows a flowchart representing chat processing carried out by the client computer.

Next, chat processing of the client computer 2 is explained by referring to a flowchart shown in FIG. 15. As shown in the figure, the flowchart begins with a step S11 at which the client computer 2 reads in an HTML file received from the WWW server 11. Then, at a next step S12, the client computer 2 forms a judgment as to whether or not the HTML file read in at the step S11 includes a description of an URL specifying the chat server 12. If the outcome of the judgment indicates that the HTML file includes a tag specifying the chat server 12, the flow of the processing goes on to a step S13 at which the client computer 2 receives a chat server setting file from the chat server 12 so that a chat can be started.

Then, at a next step S14, the client computer 2 establishes a connection with the chat server 12 based on the chat server setting file received at the step S13. Subsequently, at a next step S15, the client computer 2 forms a judgment as to whether or not a connection with the chat server 12 has been established successfully. If the outcome of the judgment indicates that a connection with the chat server 12 has been established successfully, the flow of the processing goes on to a step S16 at which processing to initialize a chat function and processing to set an avatar 23 are carried out before proceeding to a step S17.

If the outcome of the judgment formed at the step S15 indicates that a connection with the chat server 12 has not been established successfully, on the other hand, the flow of the processing goes on to the step S17, skipping the step S16.

If the outcome of the judgment formed at the step S12 indicates that the HTML file does not include a tag specifying the chat server 12, on the other hand, the flow of the processing goes on to the step S17 since no chat needs to be started anyway.

At the step S17, the client computer 2 displays a web page on an HTML display layer 22 on the basis of the HTML file read in at the step S11. Then, at a next step S18, the client computer 2 carries out input event processing in response to operations carried out on the mouse 37 and the keyboard 36. Subsequently, at a next step S19, if a chat is desired, the client computer 2 determines display positions of the avatar icons 23*a* and 23*b* and the balloons 25*a* and 25*b* on the chat layer 21 in accordance with the input event processing carried out at the step S18, and displays the avatar icons 23*a* and 23*b* and the balloons 25*a* and 25*b* as a chat layer 21 superposed on the HTML display layer 22. The processing of the step S19 is skipped when no chat is desired.

Then, at a next step S20, the client computer 2 forms a judgment as to whether or not a position of a description of a link to another web page included in the HTML file has been clicked. If the outcome of the judgment indicates that a position of a description of a link to another web page included in the HTML file has been clicked, the flow of the processing goes on to a step S21 since it is necessary to update the web page currently displayed. At the step S21, a URL of the destination of the link to the other web page described at the clicked position is read in. Then, the flow of the processing goes back to the step S11 to repeat the operation to read in an HTML file.

If the outcome of the judgment formed at the step S20 indicates that a position of a description of a link to another web page included in the HTML file has not been clicked, on the other hand, the flow of the processing goes on to a step S22 at which the client computer 2 forms a judgment whether the chat processing has come to an end. If the outcome of the judgment indicates that the chat processing has not come to an end, the flow of the processing goes back to the step S17 to repeat the processing starting with the operation to display an HTML file.

If the outcome of the judgment formed at the step S22 indicates that the chat processing has come to an end, on the other hand, this procedure is completed.

As described above, the user of the client computer 2 is capable of displaying a page as an HTML display layer 22 based on an HTML file received from the web server 11 and displaying the avatar icons 23a and 23b as a chat layer 21.

The following description explains processing to limit chat partners of the user of the client computer 2 by referring to a flowchart shown in FIG. 16. As shown in the figure, the flowchart begins with a step S51 at which the client computer 2 establishes a communication with the chat server 12. Then, at a next step S52, the client computer 2 forms a judgment as to whether or not user information stored in a user information table shown in FIG. 13 has been received. If the outcome of the judgment indicates that user information stored in a user information table and shared data have been received, the flow of the processing goes on to a step S53 to read in a user limitation condition entered by the user through a filtering condition setting window shown in FIG. 14. Then, at a next step S54, the client computer 2 carries out processing to select chat partners from the user information matching the user limitation condition.

Subsequently, at a next step S55, the client computer 2 forms a judgment as to whether or not there is a user of the user information that matches the user limitation condition. If the outcome of the judgment indicates that there is a user of the user information that matches the user limitation condition, the flow of the processing goes on to a step S56 to display the avatar icons 23a and 23b before proceeding to a step S57.

If the outcome of the judgment formed at the step S55 indicates that there are not no user of the user information that matches the user limitation condition, on the other hand, the flow of the processing goes on to the step S57, skipping the step S56.

At the step S57, the client computer 2 forms a judgment as to whether there is user information that remains to be checked by the matching judgment of the step S55. If the outcome of the judgment indicates that there is user information that remains to be checked by the matching judgment, the flow of the processing goes back to the step S54 to repeat the processing to select a chat partner matching the user limitation condition from the user information.

If the outcome of the judgment formed at the step S57 indicates that there are not user information and shared data that remain to be checked by the matching judgment, on the other hand, the flow of the processing goes on to a step S58.

If the outcome of the judgment formed at the step S52 indicates that user information stored in a user information table and shared data have not been received, on the other hand, the flow of the processing goes on to the step S58.

At the step S58, the client computer 2 forms a judgment as to whether or not the user limitation processing has come to an end. If the outcome of the judgment indicates that the user limitation processing has not come to an end, the flow of the processing goes back to the step S51 to start all over again.

If the outcome of the judgment formed at the step S58 indicates that the user limitation processing has come to an end, on the other hand, this procedure is terminated.

As described above, the client computer 2 is capable of limiting the number of avatars 23 to be displayed and the number of chat partners in accordance with a limitation condition. As a result, the conversation can be carried forward fast without becoming confusing even if a number of users have a chat using the same page.

Figure 17A:
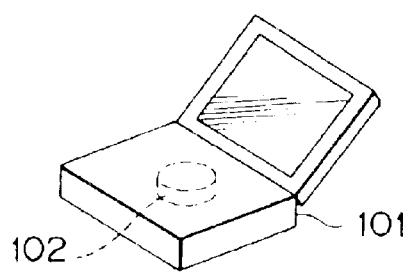
FIGS. 17A, 17B and 17C are explanatory diagrams showing media.
Figure 17B:
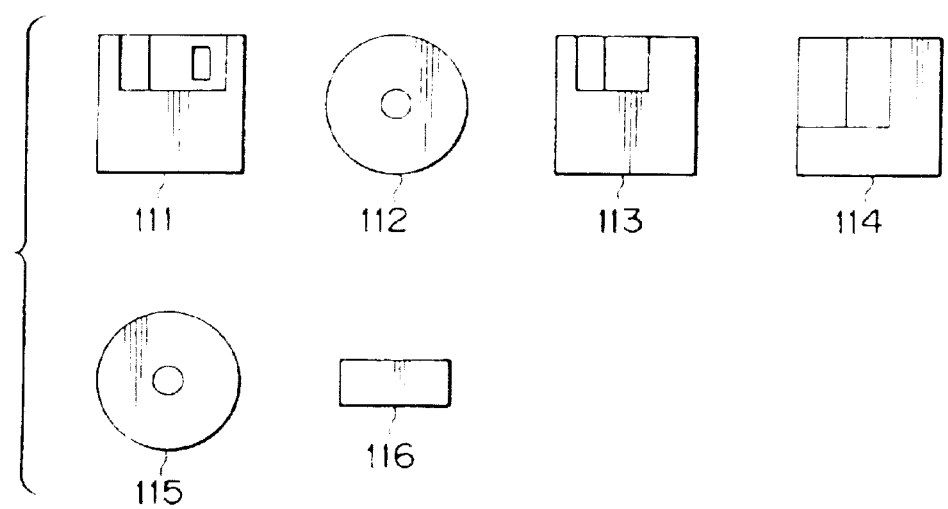
Figure 17C:
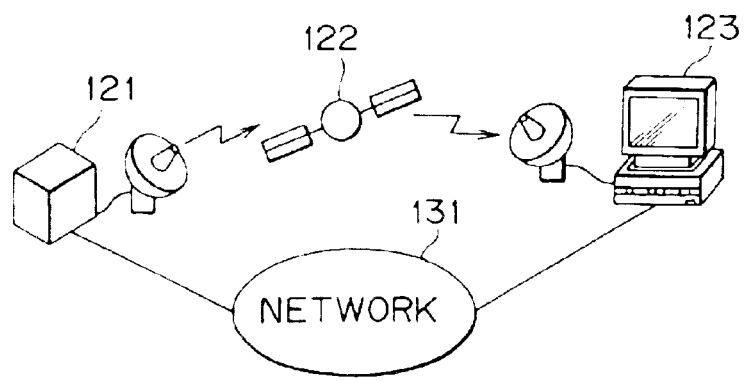

The next description explains media used for installing a program to be executed to carry out a series of pieces of processing described above and used for setting the program in a state of being executable by a computer by referring to FIGS. 17A to 17C.

A program can be presented to the user by installing the program in a hard disc 102 in advance. As shown in FIG. 17A, the hard disc 102 is a recording medium embedded in a personal computer 101 which is capable of serving as a client computer 2.

As an alternative, a program can be presented to the user as a package software by temporarily or permanently storing the program in a recording medium such as a floppy disc 111, a CD-ROM 112, an MO disc 113, a DVD 114, a magnetic disc 115 or a semiconductor memory 116 as shown in FIG. 17B.

As another alternative, a program can be transferred to a personal computer 123 from a download site 121 by radio communication by way of a satellite 122 or transferred to a personal computer 123 by wire or radio communication through a network 131 such as a local area network or the Internet and, in the personal computer 123, the program is down loaded into typically a hard disc as shown in FIG. 17C.

A medium used in this specification is a broadly defined concept including all kinds of media.

In addition, steps composing a program presented by means of a medium as described in this specification imply not only serial processing but also pieces of processing carried out concurrently or individually.

It should be noted that, in this specification, a system means a complete apparatus comprising a plurality of units.

In an information sharing processing method, a medium for storing an information sharing processing program, an information sharing processing apparatus and an information sharing processing system, according to the present invention, a file is acquired from a server on a network and displayed as a page wherein the file is described in a predetermined page description language and includes a description of a link to another file on the network; an icon representing a user and a message issued by the user are displayed at a position on a common screen shared with the user making an access to the same page as the displayed page wherein information on the position and the message are described by the user in shared data transmitted by the user by way of a shared server on the network; and the common screen is displayed by superposition on the displayed page.

As a result, the users are each capable of making an access to the same web page with ease while having a chat and capable of immediately knowing whether or not another user is making an access to the same web page.

What is claimed is:

1. An information sharing processing method, comprising:

a page display processing step for acquiring a file from a server on a network, and for displaying said file as a page, wherein said file is described in a page description language and includes a description of link information to another page on said network;

a common-screen display processing step for displaying an icon representing a user at a position on a common screen displayed on a display of said user, and for displaying a message issued by said user, said user accessing said page displayed in said page display processing step, wherein information of said position of said icon on said common screen is specified in shared data transmitted by a shared server on said network; and a screen superposition processing step for superposing said common screen as a transparent layer within said page displayed in said page display processing step, wherein, in said common-screen display processing step, when said user starts accessing said another page different from said page displayed in said page display processing step, said icon representing said user, appearing on said page displaying a description of the link information, and superposed at said position on said page, vanishes to explicitly indicate that a transition from said page to said another different page has been performed.

2. An information sharing processing method according to claim 1, wherein said file displayed in said page display processing step is an HTML (Hyper Text Markup Language) file which includes a description of a URL (Uniform Resource Locator) for specifying a file on the Internet acquired from a WWW (World Wide Web) server in accordance with an HTTP (Hyper Text Transfer Protocol).

3. An information sharing processing method according to claim 2, wherein the information of said position of said icon and said message are specified by said user in the shared data transmitted by said user by a chat server on the Internet in accordance with a chat protocol; and said user is accessing a same URL as said URL displayed in said page display processing step.

4. An information sharing processing method according to claim 1, wherein said icon and said message are displayed at said position specified by said user on said common screen, said common screen being shared with another user having attributes matching predetermined settings.

5. An information sharing processing method according to claim 1, wherein at the time when said user starts accessing said another page different from said page displayed in said page display processing step, said icon representing said user gradually changes form and eventually vanishes, to explicitly indicate the transition to said another different page has been performed.

6. A medium storing computer-executable code of an information sharing processing program, the computer-executable code comprising:

computer-executable code configured to execute a page display processing step for acquiring a file from a server on a network, and for displaying said file as a page, wherein said file is described in a page description language and includes a description of link information to another page on said network;

computer-executable code configured to execute a common-screen display processing step for displaying an icon representing a user at a position on a common screen displayed on a display of said user, and for displaying a message issued by said user accessing a same page as said page displayed in said page display processing step, wherein information of said position on said common screen is specified in shared data transmitted by a shared server on said network; and computer-executable code configured to execute a screen superposition processing step for superposing said common screen as a transparent layer within said page displayed in said page display processing step, wherein, in said common-screen display processing step, when said user starts accessing said another page different from said page displayed in said page display processing step, said icon representing said user, appearing on said page displaying a description of the link information, and superposed at said position on said page, vanishes to explicitly indicate that g transition from said page to said another different page has been performed.

7. The medium of claims 6, wherein said file displayed in said page display processing step is an HTML (Hyper Text Markup Language) file which includes a description of a URL (Uniform Resource Locator) for specifying a file on the Internet acquired from a WWW (World Wide Web) server in accordance with an HTTP (Hyper Text Transfer Protocol).

8. The medium of claim 7, wherein the information of said position of said icon and said message are specified by said user in the shared data transmitted by said user by a chat server on the Internet in accordance with a chat protocol; and said user is accessing a same URL as said URL displayed in said page display processing step.

9. The medium of claim 6, wherein said icon and said message are displayed at said position specified by said user on said common screen, said common screen being shared with another user having attributes matching predetermined settings.

10. An information sharing processing apparatus, comprising:

page display processing means for acquiring a file from a server on a network, and for displaying said file as a page, wherein said file is described in a page description language and includes a description of link information to another page on said network;

common-screen display processing means for displaying an icon representing a user at a position on a common screen displayed on a display of said user, and for displaying a message issued by said user accessing a same page as said page displayed by said page display processing means, wherein information of said position on said common screen is specified in shared date transmitted by a shared server on said network; and screen superposition processing means for superposing said common screen as a transparent layer within said page displayed by said page display processing means, wherein, said common-screen display processing means includes means for causing, when said user starts accessing said another page different from said displayed page, said icon representing said user, appearing on said page displaying a description of the link information, and superposed at said position on said page, to vanish to explicitly indicate that a transition from said page to said another different page has been performed.

11. The apparatus of claim 10, wherein said file displayed by said page display processing means is an HTML (Hyper Text Markup Language) file which includes a description of a URL (Uniform Resource Locator) for specifying a file on the Internet acquired from a WWW (World Wide Web) server in accordance with an HTTP (Hyper Text Transfer Protocol).

12. The apparatus of claim 11, wherein the information of said position of said icon and said message are specified by said user in the shared data transmitted by said user by a chat server on the Internet in accordance with a chat protocol; and said user is accessing a same URL as said URL displayed by said page display processing means.

13. The apparatus of claim 10, wherein said icon and said message are displayed at said position specified by said user on said common screen, said common being shared with another user having attributes matching predetermined settings.

14. An information sharing processing system, comprising:
- a server for providing a file described in a page description language and including a description of link information to another desired page on a network;
- a shared server for exchanging shared data with users on said network through said network, wherein said shared data includes information of positions on a common screen to be shared with said users, and wherein respective icons represent said users and messages issued by said users;
- page display processing means for acquiring a file from said server, and for displaying said file as a page;
- common-screen display processing means for displaying said icons representing said users at said positions on said common screen shared with said users, and for displaying said messages issued by said users, each user accessing the same page as said page displayed by said page display processing means, wherein information of said positions on said common screen are specified in said shared data transmitted by said shared server; and
- screen superposition processing means for superposing said common screen as a transparent layer within said page displayed by said page display processing means,
- wherein, said common-screen display processing means includes means for causing, when a user starts accessing said another page different from said displayed page displayed on a display of said user, said icon representing said user, appearing on said page displaying a description of the link information, and superposed at said position on said page, to vanish to explicitly indicate that a transition from said page to said another different page has been performed.

15. The system of claim 14, wherein said file displayed by said page display processing means is an HTML (Hyper Text Markup Language) file which includes a description of a URL (Uniform Resource Locator) for specifying a file on the Internet acquired from a WWW (World Wide Web) server in accordance with an HTTP (Hyper Text Transfer Protocol).

16. The system of claim 15, wherein the information of said position of said icon and said message are specified by said user in the shared data transmitted by said user by a chat server on the Internet in accordance with a chat protocol; and
said user is accessing a same URL as said URL displayed by said page display processing means.

17. The system of claim 14, wherein said icon and said message are displayed at said position specified by said user on said common screen, said common screen being shared with another user having attributes matching predetermined settings.

18. An information sharing processing method, comprising:
- acquiring a file from a server on a network, and displaying said file as a page, wherein said file is described in a page description language and includes a description of link information to another page on said network;
- displaying an icon representing a user at a position on a common screen displayed on a display of said user, and displaying a message issued by said user, said user accessing said page, wherein information of said position of said icon on said common screen is specified in shared data transmitted by a shared server on said network; and
- superposing said common screen as a transparent layer within said page, wherein said step of displaying the icon comprises, when said user starts accessing said another page different from said page, causing said icon representing said user, appearing on said page displaying a description of the link information and superposed at said position on said page, to vanish to explicitly indicate that a transition from said page to said another different page has been performed.

19. A medium storing computer-executable code of an information sharing processing program, the computer-executable code comprising:
- first computer-executable code configured to acquire a file from a server on a network and to display said file as a page, wherein said file is described in a page description language and includes a description of link information to another page on said network;
- second computer-executable code configured to display an icon representing a user at a position on a common screen displayed on a display of said user, and to display a message issued by said user accessing a same page as said page displayed by said first computer-executable code, wherein information of said position on said common screen is specified in shared data transmitted by a shared server on said network; and
- third computer-executable code configured to superpose said common screen as a transparent layer within said page displayed by said first computer-executable code, wherein said second computer-executable code is configured to cause, when said user starts accessing another page different from said page displayed by said first computer-executable code step, said icon representing said user, appearing on said page displaying a description of the link information and superposed at said position on said page, to vanish to explicitly indicate that a transition from said page to said another different page has been performed.

20. An information sharing processing apparatus, comprising:
- a page display processor configured to acquire a file from a server on a network, and to display said file as a page, wherein said file is described in a page description language and includes a description of link information to another page on said network;
- a common-screen display processor configured to display an icon representing a user at a position on a common screen displayed on a display of said user, and to display a message issued by said user accessing a same page as said page displayed by said page display processor, wherein information of said position on said common screen is specified in shared data transmitted by a shared server on said network; and
- a screen superposition processor configured to superpose said common screen as a transparent layer within said page displayed by said page display processor,
- wherein, said common-screen display processor is configured to cause, when said user starts accessing said another page different from said displayed page, said icon representing said user, appearing on said page displaying a description of the link information and superposed at said position on said page, to vanish to explicitly indicate that a transition from said page to said another different page has been performed.

21. An information sharing processing system, comprising:
- a server configured to provide a file described in a page description language and including a description of link information to another desired page on a network;
- a shared server configured to exchange shared data with users on said network through said network, wherein said shared data includes information of positions on a common screen to be shared with said users, and wherein respective icons represent said users and messages issued by said users;
- a page display processor configured to acquire a file from said server, and for displaying said file as a page;

a common-screen display processor configured to display said icons representing said users at said positions on said common screen shared with said users, and to display said messages issued by said users, each user accessing the same page as said page displayed by said page display processor, wherein information of said positions on said common screen are specified in said shared data transmitted by said shared server; and a screen superposition processor configured to superpose said common screen as a transparent layer within said page displayed by said page display processor, wherein, said common-screen display processor is configured to cause, when a user starts accessing said another page different from said displayed page displayed on a display of said user, said icon representing said user, appearing on said page displaying a description of the link information and superposed at said position on said page, to vanish to explicitly indicate that a transition from said page to said another different page has been performed.

* * * * *